United States Patent [19]

Bell et al.

[11] Patent Number: 4,689,663
[45] Date of Patent: Aug. 25, 1987

[54] TELEVISION RECEIVER WITH DISPLAY DRIVER AMPLIFIER AND INPUT VIDEO FILTER HAVING INVERSELY RELATED BANDWIDTHS

[75] Inventors: Isaac M. Bell, Indianapolis; David E. Hollinden, Bloomington, both of Ind.

[73] Assignee: RCA Corporation, Princeton, N.J.

[21] Appl. No.: 780,947

[22] Filed: Sep. 27, 1985

[51] Int. Cl.$^4$ .......................................... H02N 5/445
[52] U.S. Cl. .................................. 358/21 R; 358/181
[58] Field of Search ................... 358/21 R, 22, 3, 64, 358/65, 74, 181, 242, 243, 38, 36, 37

[56] References Cited

U.S. PATENT DOCUMENTS

| | | | |
|---|---|---|---|
| 3,588,341 | 6/1971 | Hansen | 358/21 |
| 3,938,181 | 2/1976 | Avins | 358/38 |
| 4,020,501 | 4/1977 | Hillberger et al. | 358/64 |
| 4,167,021 | 9/1979 | Holmes | 358/36 |
| 4,241,363 | 12/1980 | Maeyama et al. | 358/31 |
| 4,276,566 | 6/1981 | Parker | 358/36 |
| 4,338,624 | 7/1982 | d'Hautecourt et al. | 358/22 |
| 4,395,729 | 7/1983 | Lewis, Jr. | 358/36 |
| 4,417,270 | 11/1983 | Nagao et al. | 358/36 |
| 4,460,918 | 7/1984 | Flasza | 358/21 R |
| 4,591,912 | 5/1986 | Belotserkovsky et al. | 358/242 |

FOREIGN PATENT DOCUMENTS

| | | | |
|---|---|---|---|
| 1161948 | 1/1964 | Fed. Rep. of Germany | 358/38 |
| 46639 | 4/1980 | Japan | 358/65 |

OTHER PUBLICATIONS

Color Television Service Data (1984) for RCA color television receiver CTC-131.

*Primary Examiner*—John W. Shepperd
*Attorney, Agent, or Firm*—Paul J. Rasmussen; Peter M. Emanuel; Ronald H. Kurdyla

[57] ABSTRACT

A television receiver responsive to a broadcast television signal in a normal operating mode includes a television signal channel with high frequency peaking circuits, followed by a display driver to which an auxiliary video signal may be applied. A low pass filter is connected between the output of the television signal channel and the display driver, which exhibits a wide bandwidth when the receiver is intended to display auxiliary video information. The bandwidth of the low pass filter is inversely related to the bandwidth of the driver such that the low pass filter exhibits a narrow bandwidth relative to the bandwidth of a wideband display driver. In addition, the low pass filter exhibits a trapping characteristic at the second harmonic frequency of the chrominance signal in a color television receiver.

3 Claims, 2 Drawing Figures

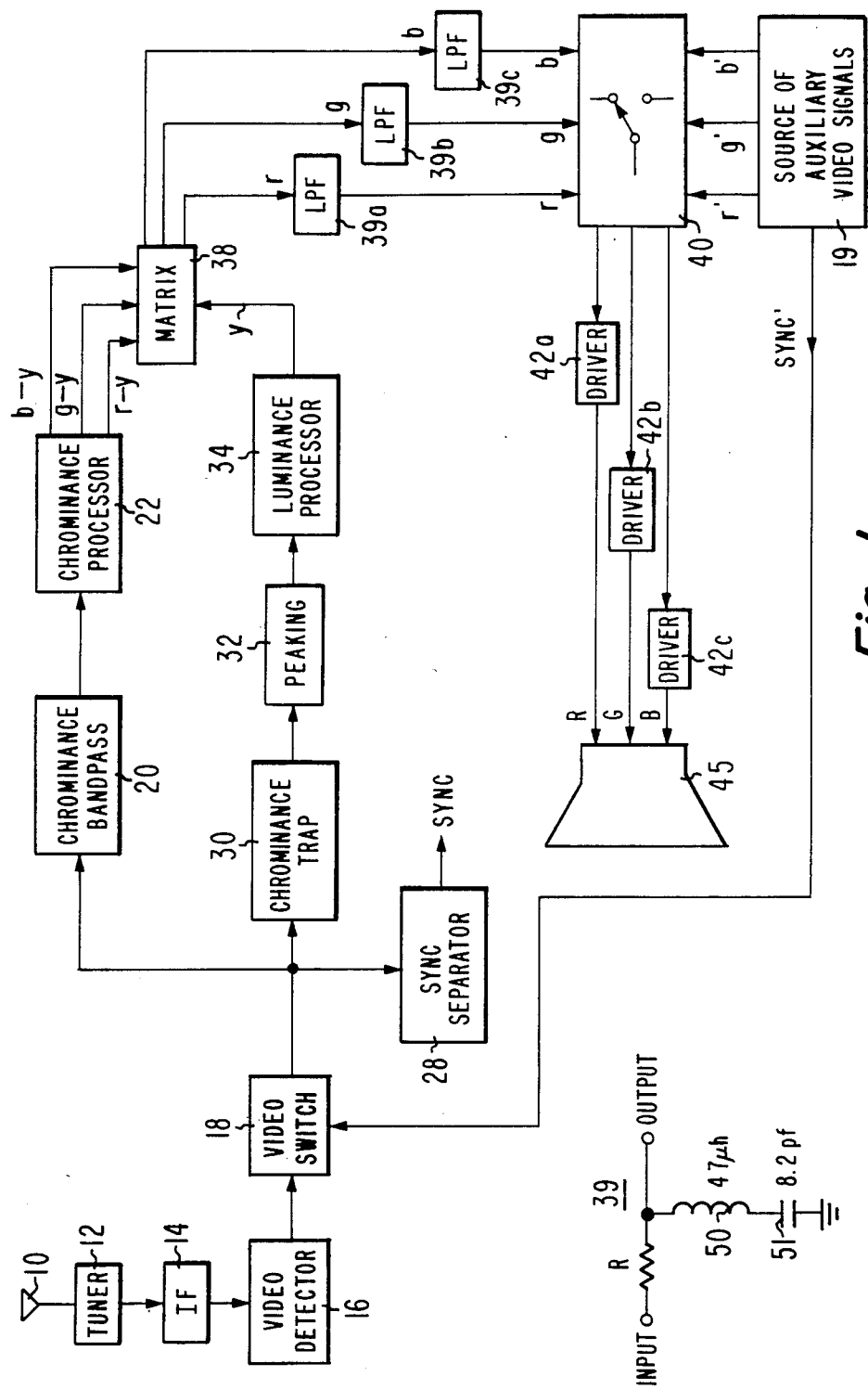

TELEVISION RECEIVER WITH DISPLAY DRIVER AMPLIFIER AND INPUT VIDEO FILTER HAVING INVERSELY RELATED BANDWIDTHS

This invention concerns a television receiver arranged to facilitate the display of both video information derived from a broadcast type television signal, and video information derived from an external auxiliary video signal.

The bandwidth of a conventional color television signal at baseband frequencies is primarily determined by the bandwidth of the luminance component of the television signal, which in accordance with NTSC broadcast television standards in the United States encompasses signal frequencies of from DC to approximately 4.2 MHz. Substantially the full 4.2 MHz luminance bandwidth is available for signal processing in a color television receiver which employs a comb filter for deriving the luminance and chrominance components from a composite color television signal. However, in a color receiver which does not employ a comb filter the bandwidth of the luminance channel is often limited to approximately 3.0 MHz due to the frequency characteristics of the intermediate frequency (IF) signal processing stage and the filtering characteristics of a chrominance trap at the input of the luminance channel. The luminance signal is often peaked to accentuate the high frequency components thereof, then amplified and combined with the chrominance component to produce color image signals which are applied to an image displaying device, such as a kinescope, via a display driver amplifier stage.

Conventional television receivers often use a "narrowband" display driver stage with a −3 db bandwidth extending approximately to a frequency in the range between 1.5 MHz and 2.0 MHz. The combination of the kinescope and narrowband driver stage may exhibit a relatively narrow bandwidth of about 2 MHz or somewhat less due to a low-pass filtering effect produced by the output impedance of the driver stage together with the capacitive load presented by the kinescope signal input (e.g., cathode electrode) to the output of the driver stage. The reduction in video channel bandwidth caused by such a narrowband driver and kinescope combination can be compensated for by high frequency peaking circuits in the luminance channel, thereby resulting in a desired overall video channel −3 db bandwidth of approximately 3.0 MHz. However, under certain circumstances, the processing of a peaked video signal can lead to unwanted effects such as increased noise related artifacts in a displayed picture and increased likelihood of video regeneration, among other effects. The latter effect refers to high frequency spectrum video signal components coupled to luminance and chrominance processing circuits such as by means of parasitic capacitances, for example.

When a television receiver is intended to display auxiliary video signal information, the receiver is typically arranged so that an auxiliary video input signal is applied directly to the input of the display driver stage, without being subject to the normal signal processing imparted by the luminance and chrominance channels to a received broadcast television signal. The auxiliary signal may be associated with Teletext, video games or computer signal sources, for example. A receiver with auxiliary signal input capability preferably should employ a "wideband" display driver stage in order to achieve better resolution of the information which is commonly associated with such auxiliary input signal, e.g., alphanumeric characters having fine image detail. Thus a receiver with auxiliary video input signal capability will benefit from a wideband display driver stage with a −3 db bandwidth on the order of 5 MHz to 7 MHz, for example.

A television receiver with auxiliary video input signal capability and a wideband display driver stage may, however, exhibit excessive overall bandwidth and excessive high frequency peaking for normal processing of received broadcast television signals from the antenna input of the receiver through the luminance and chrominance signal processing channels to the display driver stage. Specifically, the combination of high frequency signal peaking provided by the luminance channel and a wideband display driver stage can undesirably lead to video output signals with a distorted transient response, as well as a greater chance of video regeneration and high frequency noise contaminating a displayed picture. The overall wide bandwidth created by the combination of peaking in the luminance channel with a wideband display driver also increases the likelihood that a phenomenon sometimes referred to as a "(power) line conducted interference" may prove troublesome. Such interference, which may involve signal frequencies at audio, video, and deflection rates, is amplified and eventually conducted by the main AC power lines, and can be picked up by another receiver connected to the same AC power line.

Another problem which is often encountered in the case of a wideband receiver is that a significant amount of the 7.16 MHz second harmonic frequency of the 3.58 MHz chrominance subcarrier frequency is present at the inputs of the display driver. While a narrowband display driver attenuates such second harmonic component significantly, a wideband display driver may pass such component with little or no attenuation. This is undesirable since such second harmonic can produce adverse effects associated with video regeneration and other forms of interference.

The likelihood that the aforementioned undesirable signal conditions will occur conplicates the design of a television receiver which is expected to process broadcast television type signals received from a television antenna or a video casette recorder most of the time, while occasionally processing auxiliary video signal information when selected for viewing by a user. The likelihood of such unwanted conditions occuring is significantly reduced by a television receiver arranged in accordance with the principles of the presert invention. Also, the design and manufacture of a receiver intended to process and display either broadcast type television signals alone in one case, or broadcast type television signals and auxiliary video signals selectively in another case, is facilitated in that a display driver of required bandwidth (either narrowband or wideband) can be employed together with preceding video signal processing circuitry of the same design in either case. That is, it is not necessary to change the design of the preceding video signal processing circuitry to accomodate the use of a narrowband driver in one case, or a wideband driver in another case.

A disclosed television receiver in accordance with the present invention includes a video signal processing channel with peaking circuits followed by a display driver stage which receives video input signals from the video channel via a low pass filter which exhibits a bandwidth (narrowband or wideband) inversely related to the bandwidth (wideband or narrowband) of the driver stage. The filter exhibits a wide bandwidth, e.g., a −3 db bandwidth of approximately 4-5 MHz, encompassing the normal video signal bandwidth, when the receiver employs a narrowband display driver stage. However, the filter exhibits a relatively narrow bandwidth, e.g., a −3 db bandwidth of approximately 2 MHz, when the receiver employs a wideband display driver stage intended to process an auxiliary video input signal in addition to the normal video signal. In each case the overall frequency response of the video channel with the display driver is substantially the same.

Further in a disclosed embodiment of the invention, the low pass filter exhibits a trapping (null) characteristic at a frequency corresponding to the second harmonic frequency of the chrominance subcarrier signal.

In the drawing:

FIG. 1 shows a block diagram of a portion of a color television receiver arranged in accordance with the principles of the present invention; and FIG. 2 illustrates a circuit embodiment of a filter employed in the arrangement of FIG. 1.

In FIG. 1, a broadcast composite color television signal received by an antenna 10 is coupled to a tuner 12 where the received signal is converted to an intermediate frequency (IF) signal. Alterntively, a signal from a video cassette recorder can be applied to the receiver via the antenna input. An IF stage 14 amplifies and filters the IF signal. The video component of the output IF signal from IF stage 14 is detected by a video detector 16 which provides an output baseband composite television signal including luminance, chrominance and image synchronizing signal components.

The detected television signal from unit 16 is applied to one signal input of a video switch 18. Another signal input of video switch 18 receives a SYNC' image synchronizing signal from a source of auxiliary video signals 19 which provides r', g' and b' auxiliary color video signals to a switch 40 as will be discussed. Video switch 18 is, for example, the TA 7348P integrated circuit commercially available from Toshiba Corporation of Kawasaki, Japan. Video switch 18 may be either manually or automatically controlled for selectively coupling either detected television signals (in a normal operating mode of the receiver), or the auxiliary SYNC' signal (in an auxiliary operating mode), to subsequent video signal processing circuits as will also be discussed.

In the normal operating mode the detected television signal is coupled via switch 18 to a chrominance signal processing channel including an input chrominance bandpass filter 20, and a chrominance signal processor 22 which provides plural output color difference signals r-y, g-y and b-y in known fashion. Chrominance bandpass filter 20 separates the chrominance component from the detected composite television signal, and exhibits a −3 db frequency passband of 3.58 MHz +0.5 MHz, where the 3.58 MHz center frequency corresponds to the chrominance subcarrier frequency. Bandpass filter 20 is of conventional design and is sometimes referred to as a "chroma peaker".

The detected composite television signal conveyed via switch 18 is also applied to a sync separator network 28 for deriving horizontal (line) and vertical (field) image synchronizing (SYNC) components from the composite televison signal. The derived SYNC components are applied to sync processing and kinescope deflection control circuits of the receiver (not shown) for synchronizing a displayed image.

The detected television signal from switch 18 is also applied to a luminance channel of the receiver comprising an input chrominance trap 30, a peaking circuit 32 and a luminance porcessor 34. Chrominance trap 30 is of conventional design and removes the 3.58 MHz chrominance subcarrier component from signals being applied to luminance peaking circuits 32. Peaking circuits 32 accentuate high frequency components of the luminance signal, usually with regard to signals in the vicinity of 2.0 MHz, depending on the nature and manner of operation of the peaking circuit. In some receivers the peaking frequency varies with the setting of a viewer adjustable manual peaking control. In many receivers the peaking circuit also advantageously provides phase compensation for IF group delay effects, as well as providing a given amount of luminance signal delay to assist equalizing the luminance and chrominance signal transit times.

Luminance peaking commonly increases the steepness of the slope of the video signal amplitude transitions so as to generate a signal "preshoot" just before an amplitude transition, and a signal "overshoot" just after an amplitude transition. Peaking systems of this type including both automatic and manual control provisions are described, for example, in U.S. Pat. No. 4,351,003—Harlan and U.S. Pat. No. 4,388,648—Harwood et al. The peaked luminance signal is afterwards processed by unit 34 which includes amplifier, level shifting and DC level setting circuits, for example.

The amplified and peaked luminance signal from processor 34 is combined in a matrix amplifier 38 with the plural color difference signals from chrominance processor 22 to produce low level red, green and blue color image representative signals r, g and b. These signals are coupled via respective low pass filters 39a, 39b and 39c to one set of signal inputs of a video switch 40. Auxiliary color video signals r', g' and b' from source 19 are applied to another set of signal inputs of switch 40. In this example switch 40 can be the M51322P integrated circuit commercially available from Mitsubishi Electric Corporation of Hyogo, Japan.

In the normal operating mode switch 40 conveys signals r, g and b to respective display driver amplifiers 42a, 42b and 42c which provide high level, amplified color signals R, G and B to intensity control electrodes (e.g., cathode electrodes) of a color image displaying kinescope 45. Driver amplifiers 42a, 42b and 42c are preferably arranged in a cascode configuration for good high frequency response and may exhibit a frequercy bandwidth of from DC to about 6 MHz to 7 MHz, which is a bandwidth about two or three times as wide as that of a "narrowband" driver amplifier. A wideband driver stage assists to achieve better resolution of the fine detail information usually associated with alphanumeric character information as determined by auxiliary signals r', g' and b'.

The wideband characteristics of a display driver amplifier are determined by several design factors, some of which are mentioned below. The amplifier load resistors are selected to have low values to reduce the low pass filtering effect produced by the load resistors in combination with the kinescope capacitance. Load resistors having inherently low parasitic capacitance are used. Amplifier transistors with good high frequency response are used, and the amplifiers are located close to the kinescope signal input terminals to reduce the amount of parasitic capacitance associated with long connecting wires. Peaking coils in the output circuit of each amplifier also contribute to the wideband response of the amplifiers. One type of suitable wideband kinescope driver stage responsive to auxiliary r, g, b input signals is employed in the CTC-131 color television receiver chassis manufactured by RCA Corporation, as described in the 1984 RCA Color Television Service Data for the CTC-131 receiver.

In the auxiliary operating mode of the receiver, auxiliary color signals r', g' and b' rather than signals r, g and b are directly conveyed via switch 40 to drivers 42a, 42b and 42c, respectively. At the same time the SYNC' synchronizing signal associated with source 19 is conveyed via video switch 18 to sync separator 28, and from the output of sync separator 28 to deflection circuits of the receiver (not shown) for synchronizing the display of images associated with signals from source 19. Control of switches 18 and 40 as between the normal and auxiliary display modes can be performed manually by a viewer, or automatically such as in response to a programmed control signal produced by a microprocessor included in the receiver.

The normal video signal processing channel from the output of switch 18 to the inputs of low pass filters 39a–39c exhibits a −3 db bandwidth which encompasses the video signal bandwidth of from DC to approximately 4.2 MHz.

Normally the bandwidth of a low pass filter network immediately preceding the display driver stages exhibits a bandwidth substantially matched to or somewhat greater than the bandwidth of the driver stages, i.e., conventionally such a low pass filter network has a cut-off frequency substantially equal to or slightly greater than the cut-off frequency of the driver stages. In accordance with the principles of the present invention, filters 39a–39c are disposed prior to the driver stages for filtering the normal r, g, b color signals from the output of the video channel with one of at least two frequency responses depending upon the bandwidth of the driver stages used in the receiver as will be explained. The configuration of each of low-pass filters 39 is shown by filter circuit 39 of FIG. 2.

The filter of FIG. 2 includes a resistor R coupled in series between input and output terminals of the filter, and a series tuned combination of an inductor 50 and a capacitor 51 shunting the signal path at the filter output. In this example, resistor R assumes either of two values depending on the frequency response desired for the filter network, which in turn depends upon the bandwidth of the driver stages employed in the receiver, as will be discussed. Filter 39 exhibits a low pass response primarily determined by the values of resistor R and capacitor 51, and a trap (null) response at the 7.16 MHz second harmonic frequency of the chrominance subcarrier determined by the values of resistor R, inductor 50 and capacitor 51.

In a wideband filter configuration, resistor R exhibits a value of approximately 1200 ohms whereby filter 39 exhibits a flat low pass characteristic with an upper −3 db cut-off frequency of approximately 4 MHz to 5 MHz. In a narrowband filter configuration, resistor R exhibits a value of approximately 2200 ohms whereby filter 39 exhibits a restricted low pass characteristic with an upper −3 db cut-off frequency of approximately 1.5 MHz to 2 MHz. Filter 39 provides greater attenuation at 7.16 MHz in the narrowband filter configuration. In some receivers inductor 50 can be replaced by a wire to reduce cost, but the resulting filter configuration will no longer exhibit a trap response at 7.16 MHz.

When the television receiver is intended to display auxiliary video information and includes wideband driver stages for this purpose, filters 39 exhibit the narrowband configuration. In this case the combination of the 4 MHz–5 MHz video channel bandwidth and the restricted bandwidth of narrowband low-pass filters 39 produces an overall system bandwidth of approximately 3 MHz. Thus the wideband driver stages provide good resolution of the fine detail information which is commonly associated with auxiliary signal inputs, while the use of narrowband filters 39 in combination with the wideband driver stages produces an overall system bandwidth for the normal r, g, b signals which results in good picture resolution.

The use of filters 39 advantageously results in a receiver which obtains the full benefit of wideband display driver stages with respect to auxiliary input color image signals such as r', g' and b', and which also exhibits a good overall system bandwidth response for video signals normally processed by the luminance and chrominance channels, without experiencing the signal and display degrading effects of spurious high frequency signal conditions which are often encountered in television receivers with wideband display driver stages preceded by a video signal channel including high frequency peaking and amplifying circuits. As mentioned earlier, such undesirable spurious signal conditions include video regeneration, line conducted interference, radio frequency interference and excessive noise, for example, all of which can noticeably degrade the quality of a reproduced picture. The 7.16 MHz trapping ability of filters 39 assists to prevent degradation of a reproduced picture due to interference components particularly with respect to the second harmonic of the chrominance subcarrier frequency.

The receiver employs more economical narrowband display driver stages when the receiver is not intended to display auxiliary video signal information. In this case filters 39 exhibit the wideband configuration such that the combination of the 4 MHz–5 MHz video channel bandwidth, the 4 MHz–5 MHz bandwidth of the narrowband filters, and the 1.5 MHz–2 MHz bandwidth of the narrowband driver stages yields an overall system bandwidth of approximately 3 MHz for good picture resolution. The aforementioned spurious signal conditions are reduced in effect by use of the narrowband driver stages, and the trapping characteristic of wideband filters 39 helps reduce the effects of interference associated with the chrominance subcarrier second harmonic frequency.

The TABLE shown in FIG. 1 summarizes the relationship between the bandwidth (BW) of drivers 42 and the bandwidth of low pass filters (LPF) 39, and the type of signal to be processed by the receiver. Specifically, the TABLE indicates that drivers 42 exhibit a narrow bandwidth and low pass filters (LPF) 39 exhibit a wide bandwidth when the receiver is intended to process a video signal of the broadcast type only. The TABLE also indicates that drivers 42 exhibit a wide bandwidth and low pass filers 39 exhibit a narrow bandwidth when the receiver is intended to process either the braodcast type video signal or the auxiliary video signal from source 19.

Thus it is seen that filters 39 exhibit a bandwidth (narrow or wide) inversely related to the bandwidth (wide or narrow) of the kinescope driver stages employed. The use of filters 39 facilitates the design of a television receiver which performs well with respect to both normal broadcast television signals and auxiliary video signals of the type which typically benefit from wideband signal processing. As discussed, the frequency response of filters 39 can be modified to produce the required frequency responses by tailoring the value of resistor R. The use of filters 39 advantageously permits a single receiver chassis design to be used in common with either narrowband or wideband display driver stages, with only a single resistor change being required in filters 39 to accomodate either use.

Also, unwanted video regeneration is reduced in the case of a receiver employing wideband display drivers because the wires conveying the r, g, b signals from the main chassis to the wideband driver stages (which are typically located on a circuit board mounted on the neck of the kinescope) conduct signals with a restricted high frequency spectrum.

What is claimed is:

1. A video signal processing and display system comprising:
   a video signal channel;
   first input associated with said video signal channel for receiving a broadcast-type first video signal containing image information to be displayed, said video channel exhibiting a given signal bandwidth;
   a peaking circuit included in said video channel for peaking high frequency components of said first video signal;
   a second input for receiving a second, auxiliary video signal containing information to be displayed;
   an image display device;
   display driver amplifier mean having a predetemined wide bandwidth consistent with a bandwidth of said auxiliary second video signal, for providing an amplified video signal to a signal input of said display device;
   means for selectively coupling either said peaked first video signal from an output of said video channnel or said second video signal form said second input to said display driver amplifier means; and
   low pass filter means for filtering said peaked first video signal from said output of said video channel, said filter means having a predetermined bandwidth narrower than said bandwidth of said display driver amplifier to prevent said system from exhibiting excessive overall bandwidth and excessive high frequency peaking with respect to processing of said first video signal.

2. A system according to claim 1, wherein
   said first video signal includes a luminance component and a chrominance subcarrier component processed by said video channel; and
   said low pass filter means additionally selectively attenuates signal frequencies in the vicinity of the second harmonic of the frequency of said chrominance subcarrier component.

3. A system according to claim 1, wherein said low pass filter means comprises:
   a resistor coupled in series between input and output teminals of said filter means; and
   a series coupled inductor and capacitor shunting said filter output terminal.

* * * * *